United States Patent
Rudin et al.

(10) Patent No.: US 7,636,139 B2
(45) Date of Patent: Dec. 22, 2009

(54) COLOUR DISPLAY DEVICE AND METHOD OF MANUFACTURE

(75) Inventors: John Christopher Rudin, Bristol (GB); Adrian Derek Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 91 days.

(21) Appl. No.: 10/587,282

(22) PCT Filed: Mar. 17, 2005

(86) PCT No.: PCT/EP2005/051259

§ 371 (c)(1),
(2), (4) Date: May 22, 2007

(87) PCT Pub. No.: WO2005/091061

PCT Pub. Date: Sep. 29, 2005

(65) Prior Publication Data

US 2007/0200979 A1    Aug. 30, 2007

(30) Foreign Application Priority Data

Mar. 20, 2004 (GB) ................................ 0406317.8

(51) Int. Cl.
*G02F 1/1335* (2006.01)
(52) U.S. Cl. ..................................................... 349/106
(58) Field of Classification Search ........................ None
See application file for complete search history.

(56) References Cited

U.S. PATENT DOCUMENTS 6,529,239 B1   3/2003   Dyck et al.

FOREIGN PATENT DOCUMENTS

| EP | 0 250 893 A | 1/1988 |
| EP | 0 947 858 A | 10/1999 |
| EP | 1 088 877 A | 4/2001 |

OTHER PUBLICATIONS

Patent Abstract of Japan Apr. 20, 1990 JP 02 039086 Kyocera Corp.
Hochbaum A. et al "51.3: Cholesteric Color Filters: optical Characteristics Light Recycling and Brightness Enhancement" May 18, 1999 XP007008990 San Jose, California, USA.
Patent Abstracts of Japan Sep. 25, 1986 JP 61 102602 A.
Patent Abstract of Japan 60133424 A Seikosha KK.

*Primary Examiner*—Tina M Wong

(57) ABSTRACT

A color display device comprises:
a first display substrate (13) and a second display substrate (18), said substrates being spaced apart and opposed to each other;
a layer of an electro-optic material (27) between the substrates;
a set of first electrodes (17a) on an inner surface of the first display substrate (13) and a set of second electrodes (17b) on an inner surface of the second display substrate (18), the first electrodes (17a) overlapping the second electrodes (17b) to define pixels for selectively applying an electric field across at least some of said electro-optic material;
a set of first color filters (CY) on the first display substrate, each of said first electrodes being in register with one of said first color filters; and
a set of second color filters (CM) on the second display substrate, each of said second electrodes being in register with one of said second color filters.

The color of light transmitted through a pixel is determined by the light transmitted by both the first color filter and the second color filter that intersect at that pixel.

14 Claims, 26 Drawing Sheets

COLOUR DISPLAY DEVICE AND METHOD OF MANUFACTURE

The present invention relates to a colour display device and a method of manufacturing the device.

BACKGROUND TO THE INVENTION

Many colour displays operate by combining a colour filter plate with an array of electronic shutters to give controllable selection of e.g. red, green and blue areas. The colour filter must be aligned or registered with the shutters, must allow through as much of the required colour of light as possible and as little as possible of the unwanted colours. Often the colours are separated by a black matrix, to preserve colour purity in the case of small misalignments, and in particular to shield light from thin film transistors (TFTs) if they are present.

A common arrangement of shutters is a rectangular array of rectangular pixels, though other more complex arrangements have been proposed. The array may be defined on one substrate by an active matrix circuit, where the other substrate has a common ground plane, or by the intersection of row electrodes on one substrate, and column electrodes on the other. In the first case, the colour filter/black matrix must be aligned in two dimensions. In the second case, the colours can be arranged in stripes aligned with the electrode pattern to simplify alignment along the stripe direction. The pixels are usually clustered in groups, typically of three (triads—Red Green and Blue to match the colour receptors of the human eye), making a square 'superpixel' which can display a range of colours, or black and white when viewed from a distance beyond which the eye can resolve the individual pixels. Other arrangements have been proposed, such as 'quads' of four subpixels—red, two greens and blue for example. These are more difficult to register, as they have to align in both the row and column direction; however they offer several benefits:

improved appearance of image edges when displayed—sub pixels are square not rectangular;
reduction in the pitch of interconnect in one direction (from 3× superpixel pitch to 2×);
possible reduction in driver cost from r+3c to 2r+2c (r=#rows*row driver cost);
small improvement in overall aperture (interpixel gap)$^2$;
opportunity to improve the colour gamut of the display by adding a fourth colour to R, G and B.

In practice the colour filter plate is expensive to manufacture, and the image quality is strongly affected by this component. Typically the patterns are made by a number of photolithographic steps. Inkjet or similar printing has also been proposed, wherein a series of 'wells' are made (usually photolithographically) which are then filled with colour filter material such as a dyed or pigmented resin. Here the wells have to be registered with the electrode structures.

SUMMARY OF THE INVENTION

According to an aspect of the present invention there is provided a colour display device comprising:

a first display substrate and a second display substrate, said substrates being spaced apart and opposed to each other;
a layer of an electro-optic material between the substrates;
a set of first electrodes on an inner surface of the first display substrate and a set of second electrodes on an inner surface of the second display substrate, the first electrodes overlapping the second electrodes to define pixels for selectively applying an electric field across at least some of said electro-optic material;
a set of first colour filters on the first display substrate, each of said first electrodes being in register with one of said first colour filters;
a set of second colour filters on the second display substrate, each of said second electrodes being in register with one of said second colour filters;
whereby the colour of light transmitted through a pixel is determined by the light transmitted by both the first colour filter and the second colour filter that intersect at that pixel.

The display may provide superpixels and the benefits set forth above. However, each colour filter need be aligned only with one electrode on the substrate carrying the filter.

In a backlit display, the filters nearest the backlight can be made using a reflective filter technology such as a thin film stack, cholesteric liquid crystal polymer or similar, thus recycling the unwanted colour into the backlight assembly for reuse. Normally reflective colour filters have the problem of also reflecting ambient light back to the viewer, thereby reducing contrast. In the present invention the front colour filter can reduce this effect if it is a normal absorbing filter.

If the display has row stripes on one substrate which alternate between two of cyan (C), magenta (M) and yellow (Y), and column stripes which alternate between a different two of those, the arrangement will provide quads of red (R), green (G), blue (B) and whichever of CMY is present on both substrates. We envisage that an embodiment in which yellow is present on both substrates may be the preferred for optimised display brightness.

Alternatively, the visible spectrum may be divided into a desired number of regions, for example four regions: R, G, T (teal) and B. Row stripes may alternate between (R+G) absorption and (T+B) absorption; column stripes may alternate between (R+T) and (B+G) absorption. The four combinations give R, G, B and T transmission.

As another example, both substrates may be striped with filters that absorb in each of red, green, and blue transmission (ie, cyan, magenta, and yellow colours). The combination in a three-by-three grid will give nine areas—one each of cyan, magenta and yellow, and two each of red, green, and blue transmission.

The colour filters may be formed on the substrates by any method known in the art. However, a preferred method is to form the colour filters together with addressing busbars on a surface of a transfer carrier, adhere the filters and busbars to the display substrate, and then remove the transfer carrier. By using a transfer carrier with a smooth, planar surface, the filters may be formed on the display substrates without the need for a separate planarising operation.

The term "electro-optic material" is used herein to refer to a material that changes its optical properties in response to an applied electric field. Suitable electro-optic materials include liquid crystals and electroluminescent materials, and will be well known to those skilled in the art of display device manufacture. The electro-optic material may be a nematic liquid crystal functioning in a twisted or supertwisted nematic mode, a hybrid aligned mode, dyed guest-host, or any other desired mode. One or two polarisers are typically required to distinguish switched and unswitched states of the liquid crystal.

It is preferred that the electrodes and filters are parallel on a substrate and arranged orthogonally to each other on opposite substrates. Accordingly, another aspect of the invention provides a colour display device comprising first and second spaced apart display substrates enclosing a layer of an electro-optic material, an inner surface of each substrate being provided with a plurality of elongate parallel electrodes and a plurality of elongate parallel colour filters, each filter being in register with an electrode; wherein the electrodes on one of the inner surfaces are aligned substantially orthogonally to those on the other inner surface so that the colour of light transmitted through a location where two colour filters overlap is determined by the light transmitted by both of the filters.

Other aspects and benefits of the invention will appear in the following specification, drawings and claims.

The invention will now be further described, by way of example only, with reference to the following drawings.

DETAILED DESCRIPTION

Figure 1:
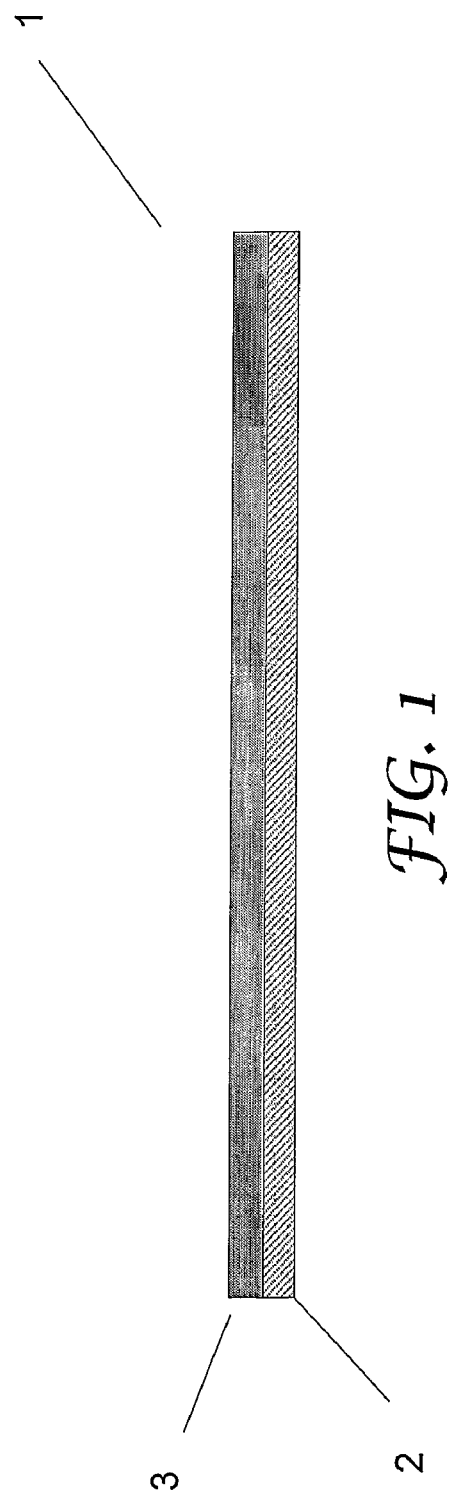
FIGS. 1 to 9 illustrate stages in the manufacture of a display substrate having colour filters, busbars and electrode tracks in a predetermined alignment, for use in making a display in accordance with an embodiment of the present invention.

In the drawings, different parts have been enlarged or reduced to aid illustration of the invention. The drawings are therefore not to scale.

Figure 25:
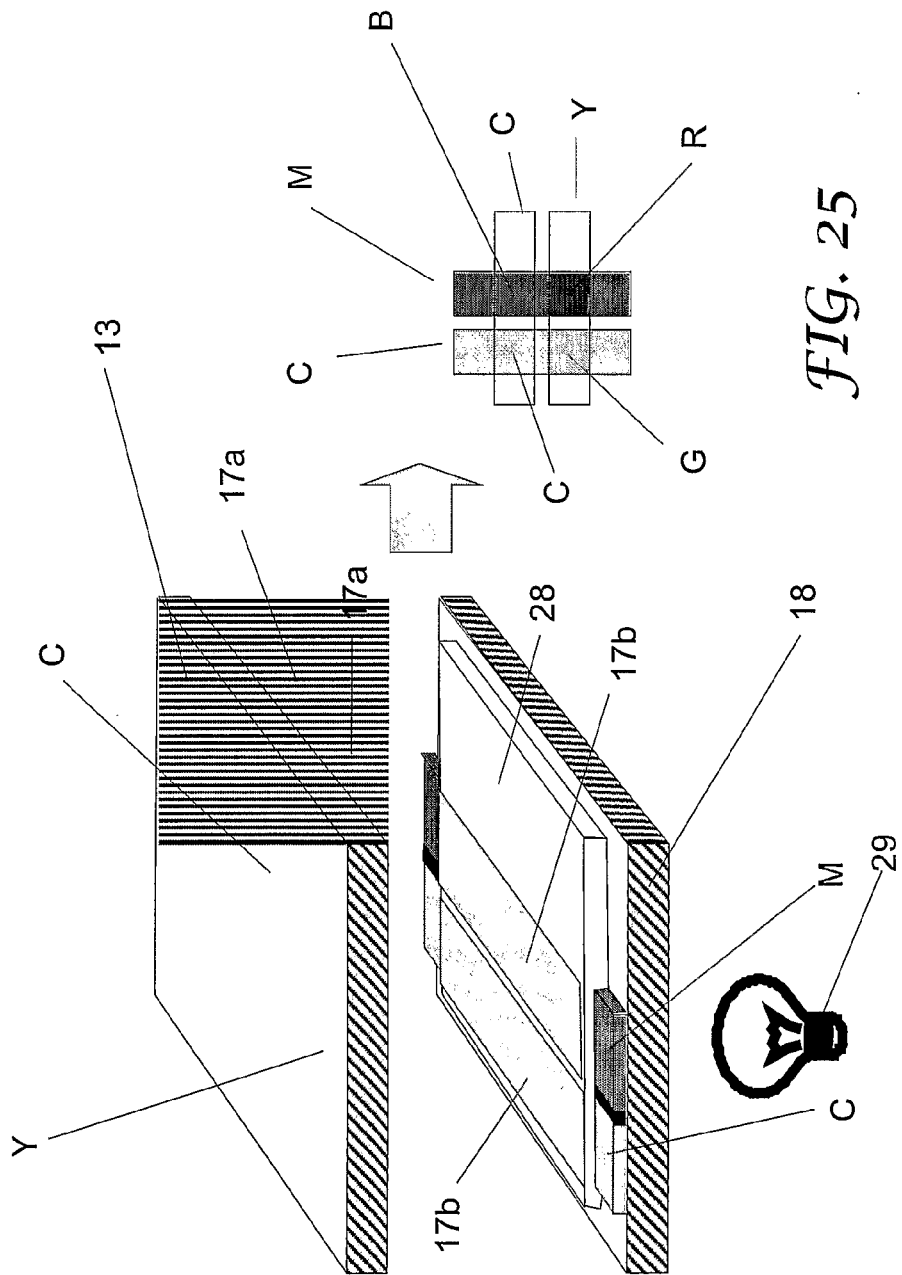
FIG. 25 is a schematic view of a display in accordance with another embodiment of the invention.

Referring to FIG. 25, an example of the invention is illustrated with reference to a display comprising a first display substrate 13 and a second display substrate 18. The substrates, typically of glass or a translucent plastics material, are spaced apart and opposed to each other. The substrates enclose a layer of a liquid crystal material (not shown). The display may be a twisted nematic display, which will be viewed through polarisers set either side of the liquid crystal material, or any other desired LCD mode.

A set of parallel first electrode stripes 17a are provided on the inner surface of the first display substrate 13 and a set of parallel second electrode stripes 17b are provided on the inner surface of the second display substrate 18. The first electrode stripes 17a are orthogonal to the second electrode stripes 17b and define pixels where they overlap. Each electrode stripe 17 has an associated colour filter which is in register with it. In this example, the first electrode stripes 17a are registered with alternate cyan (C) and yellow (Y) colour filters, and the second electrode stripes 17b are registered with C and magenta (M) colour filters.

The colour of transmitted light through a pixel is determined by the light transmitted by both the first and second colour filters, as illustrated by the diagram on the right hand side of FIG. 25. Overlap of C and M filters produces a blue pixel (B); overlap of C and Y filters produces a green pixel (G); and overlap of M and Y filters produces a red pixel (R). Overlap of both C filters, of course, produces a cyan colour. The combination of pixels (or subpixels) produces a quad superpixel.

The display in this example is backlit by a light source 29 located beneath the second display substrate 18. The colour filters CM associated with the second display substrate 18 may be reflective filters so that unwanted light is recycled back into the backlight assembly, thereby improving operating efficiency. For example, the cyan filter may transmit green and blue light, but reflect (rather than absorb) red light; the magenta filter may transmit red and blue light but reflect green light. The first colour filters (CY in this example) are absorbing filters so that a viewer seeing the display through the first display substrate 13 does not perceive a reduced contrast caused by reflected ambient light. Conventional antiglare or antireflective coatings may optionally also be incorporated in the display to further improve contrast.

A planarising layer 28 is shown on the lower substrate, to give a planar inner surface. However, it is preferred to manufacture the display by a method which does not require the application of a separate planarising layer. A preferred method is discussed below.

A carrier 1 for use in the invention is shown in FIG. 1.

The carrier 1 comprises a base film 2 on which is coated a planar, conductive layer 3. The carrier 1 may be rigid or flexible. In this example, the base film 2 comprises 150 μm thick PET and the conductive layer 3 is copper metal of about 1 μm thickness. In this example, the conductive copper layer 3 is optically flat and has been passivated by immersion in 0.1 N potassium dichromate solution for 5 minutes, rinsed with deionised water and air dried.

Figure 2:
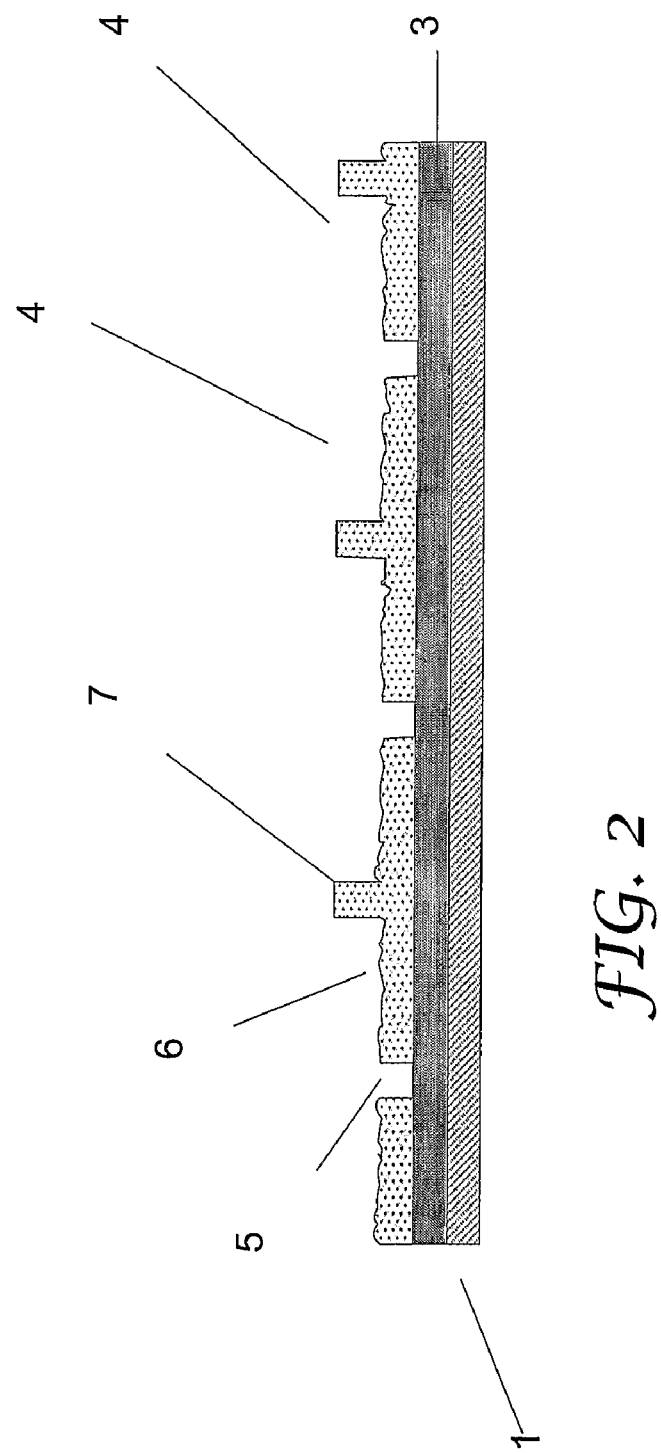

A multiple-level, controlled-roughness pattern of dielectric structures 4 is formed on the surface of the conductive layer 3 of the carrier 1 (FIG. 2). The dielectric material is optically transparent and in this example is formed by micromoulding as taught in WO 96/35971. The dielectric structures 4 are separated from each other by a series of parallel trenches 5, in which the busbars will be formed. Each structure 5 comprises a rough, planar area 6 and a raised levee 7. The planar areas (filter-receiving surfaces) 6 will accept the colour filter layers and the levees 7 will separate the colour filters. The trenches and levees are substantially linear structures which will run across the length or width of the substrate to which they are transferred. They are typically about 100 μm apart and up to many meters in length. The rough planar surfaces 6 will permit spreading of an applied ink jet coating and may optionally be treated to promote wetting. The levees 7 are smooth and may optionally be treated to further discourage wetting and flow of one colour material into an adjacent planar area.

Figure 3:
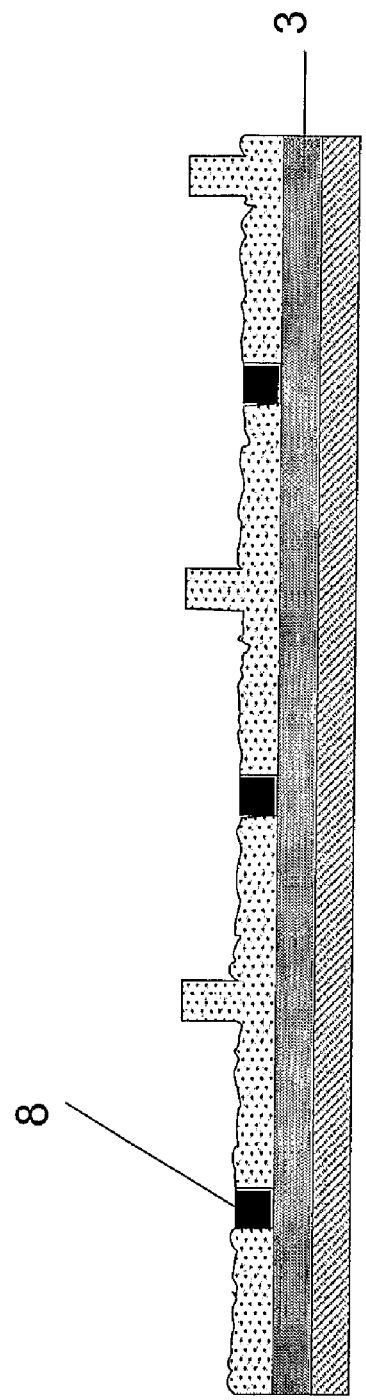

Referring now to FIG. 3, conductive material 8 is formed in the trenches 5. The conductive material is preferably a metal and, in this example, is formed by additive electroforming. It is preferred that the conductor 3 forms the cathode of an electrolytic cell with a nickel anode and standard nickel sulphamate-based electrolyte. Plating may be carried out by DC, with pulsed or biased AC current being used to fill in the trenches completely. Other known electroplating or electroless plating techniques may be employed. Suitable metals include nickel, copper and gold.

Figure 4:
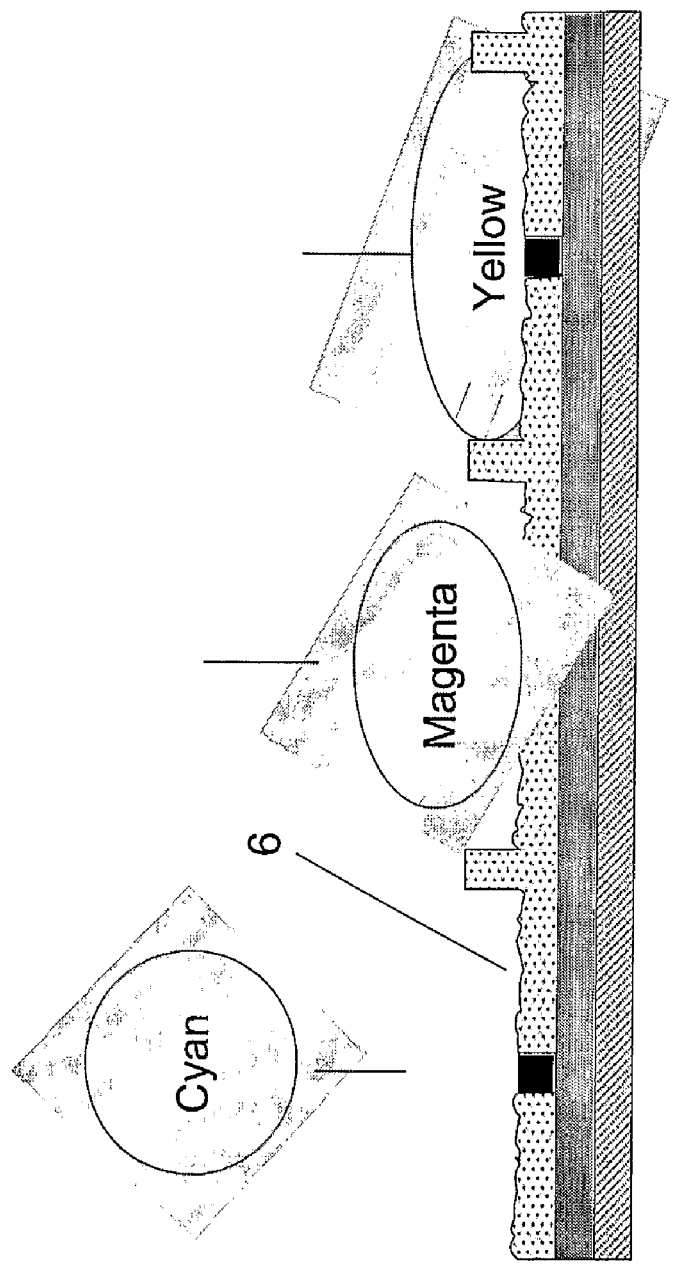
Figure 5:
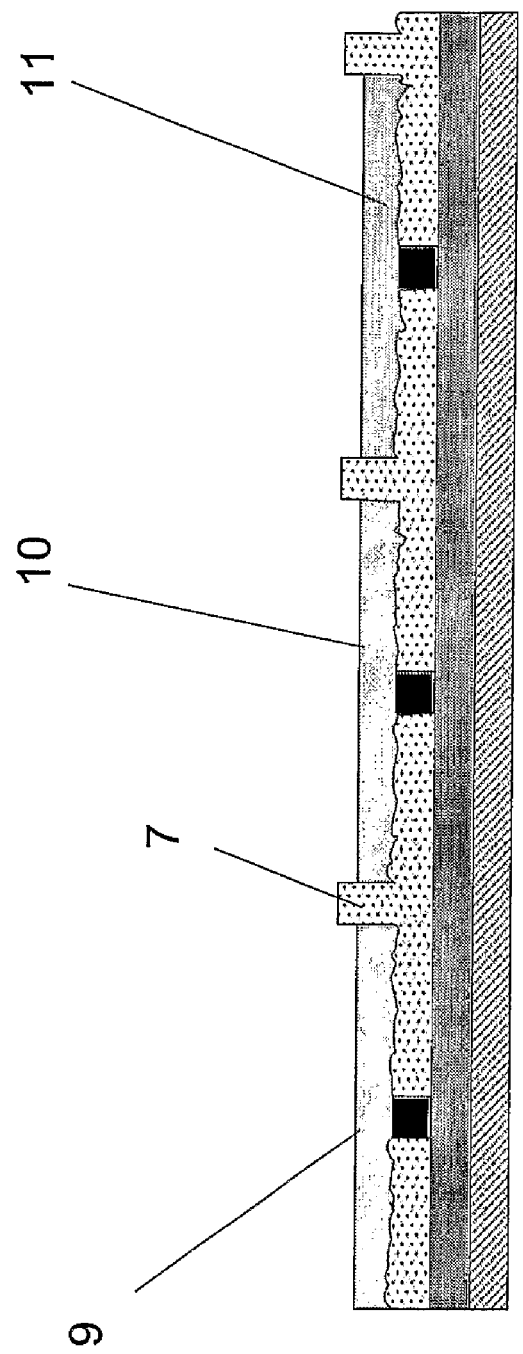

The resulting metallised structure is coated with colour filter material (FIGS. 4 and 5). In this example the material is deposited by ink jet printing in the colour-receiving planar areas 6 to produce cyan 9, magenta 10, and yellow 11 colour filter triads. Other colour combinations may optionally be used. In a preferred embodiment, the colour filter material is a dyed UV-curable resin (Brewer Science, Inc PSC). Examples of suitable inkjet nozzles include thermal and piezo nozzles, although other depositing means and techniques may be used. The alignment of droplets is not critical because the filter material is allowed to spread out across the planar regions 6 and is constrained by the levees 7 from flowing into the adjacent channels. The planar areas 6 are preferably suitably roughened to help the applied colour filter material wet out and key in. The filter material 9, 10, 11 may be cured after coating, for example by UV exposure and/or thermal treatment.

Figure 6:
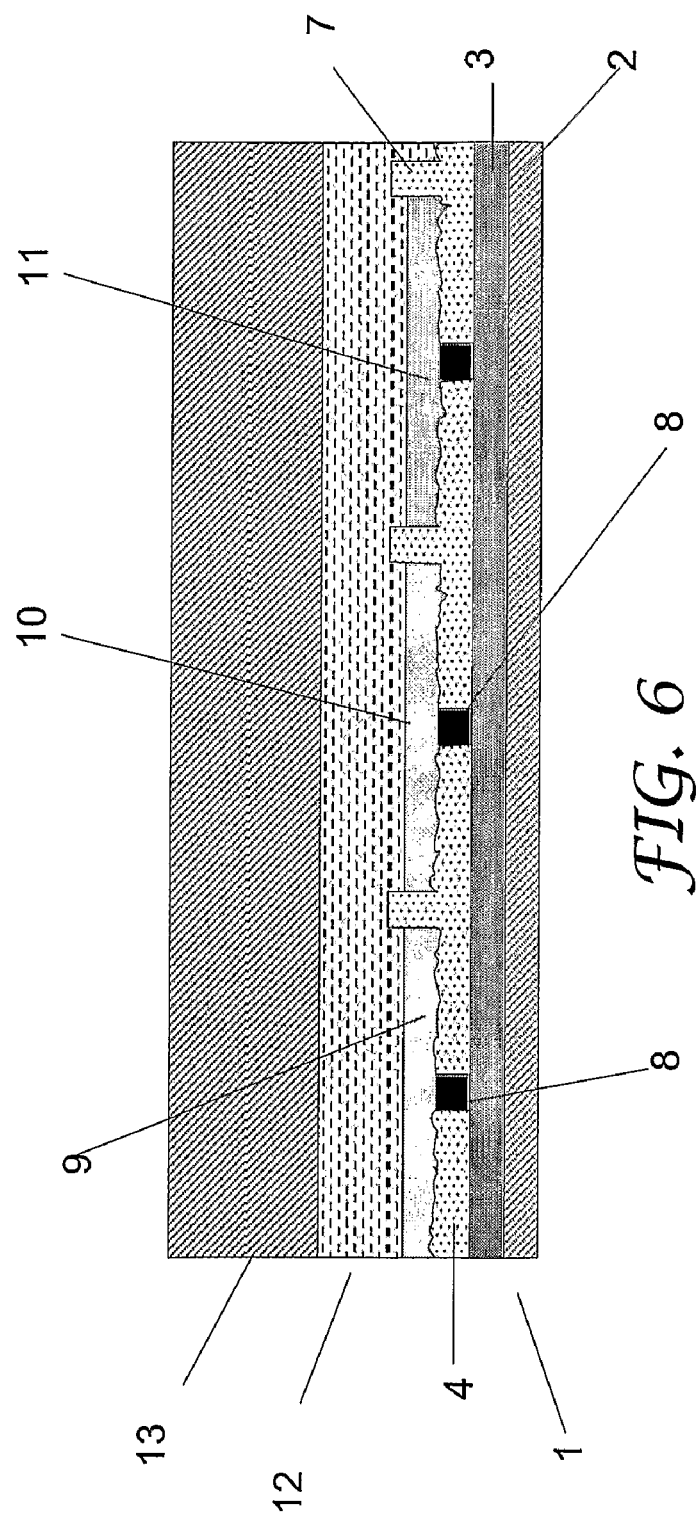

After curing of the colour filters 9, 10, 11, the resulting structure is then treated with a transfer adhesive 12, and the final display substrate 13 is laminated and the adhesive 12 is cured (FIG. 6). In a preferred embodiment the transfer adhesive 12 is a UV-curable material such as NOA81 (Norland Optical Products) but may be thermal- or moisture-cured. The display substrate 13 is preferably a plastics material, for example PEN (DuPont Teijin Teonex Q65), PES (Sumitomo Bakelite) or polyArylate (Ferrania SpA-Arylite), but could comprise glass, preferably a UV-translucent glass.

Figure 7:
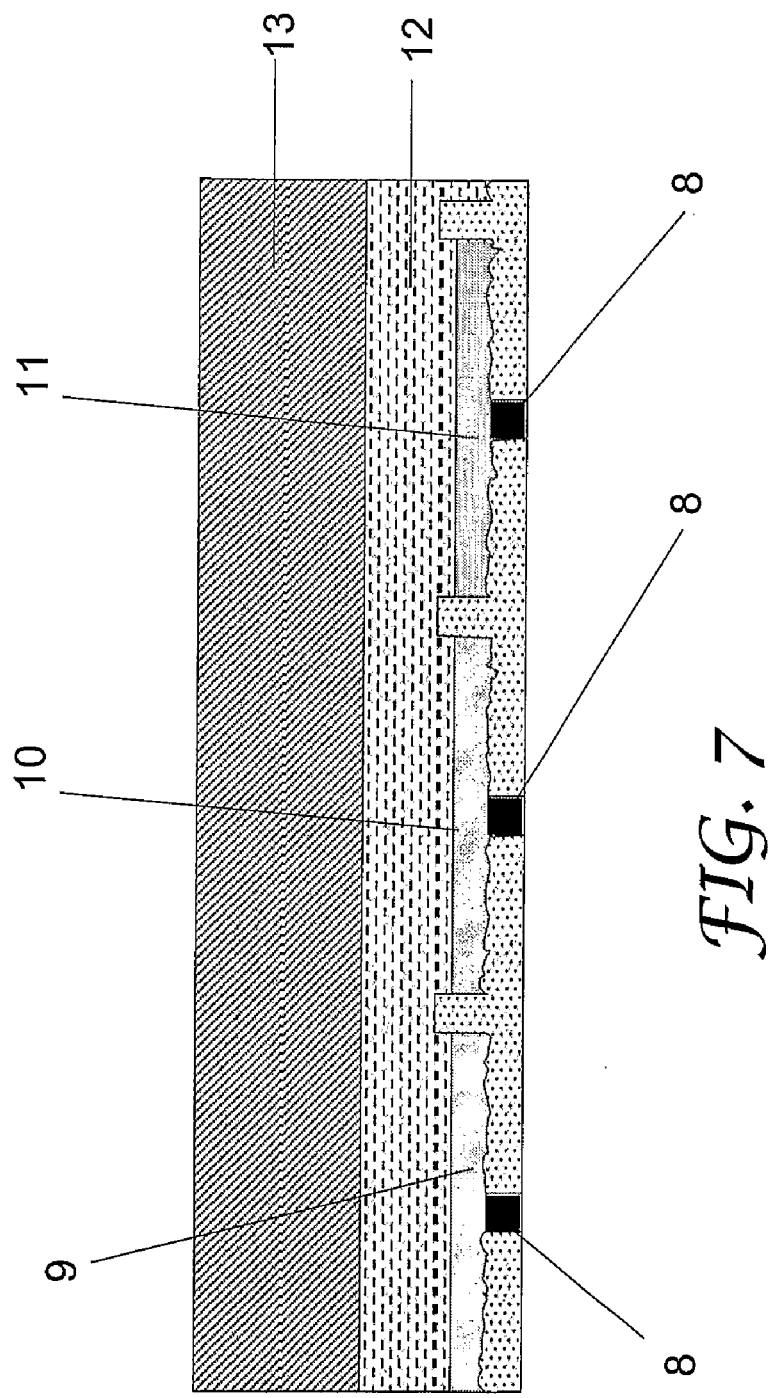

The carrier 1 is then peeled away, leaving the colour filter/busbar laminate shown in FIG. 7.

Figure 8:
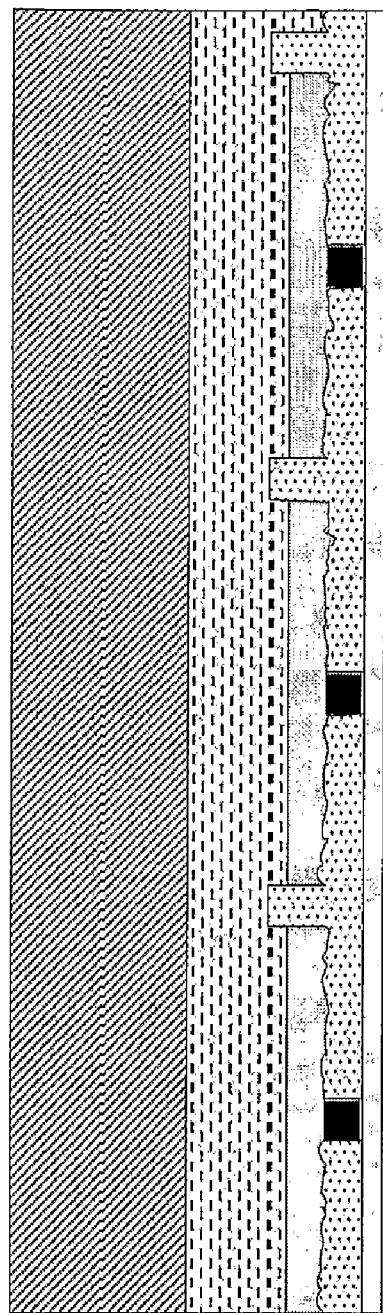

To form electrodes, a transparent conductor 14 is deposited onto the released surface of the laminate structure, as illustrated in FIG. 8. The conductor 14 may comprise indium oxide, tin oxide, indium tin oxide (ITO) or the like, but is preferably an organic conductor such as PEDOT:PSS (Bayer Baytron P).

Figure 9:
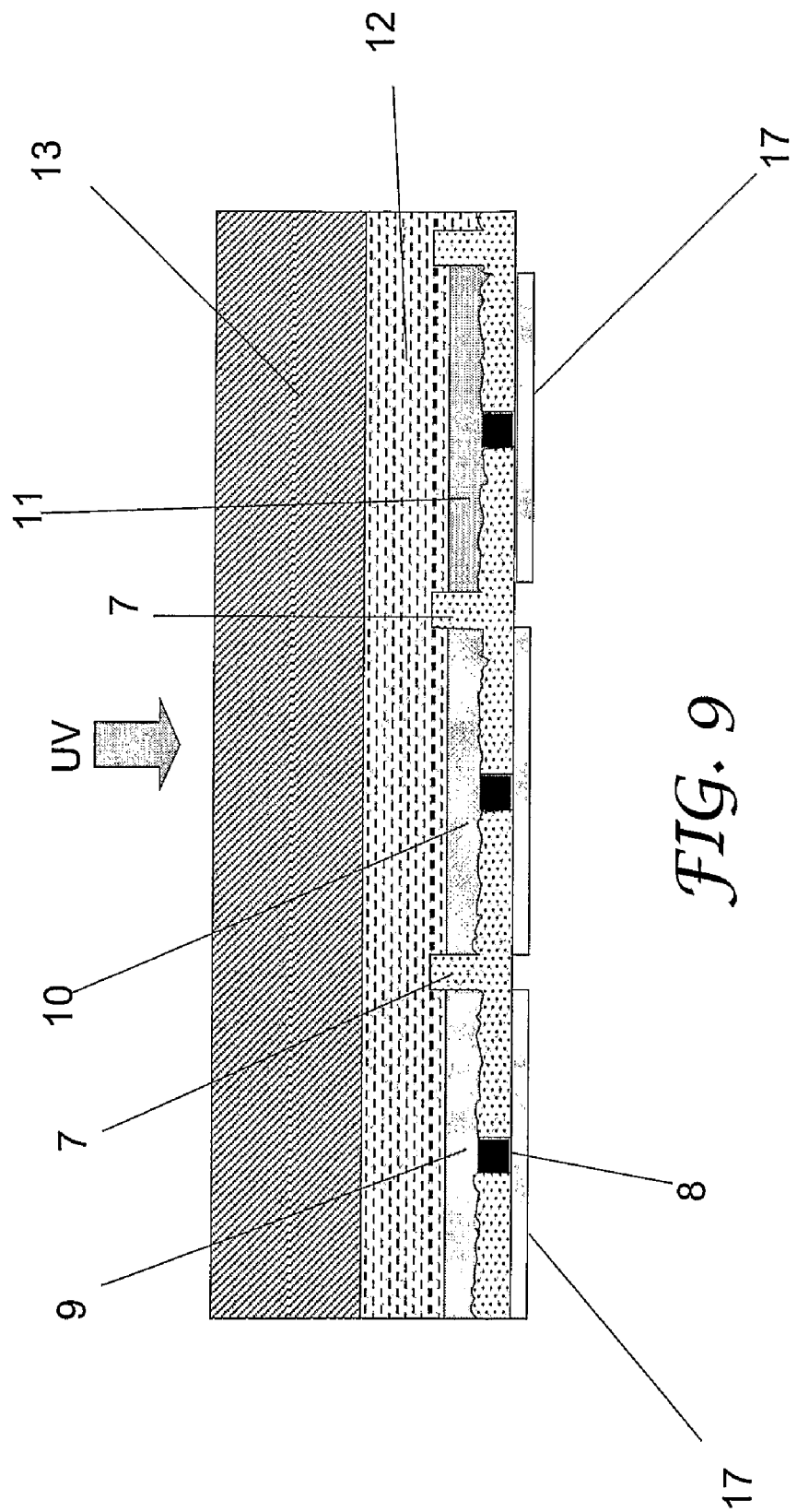
Figure 10:
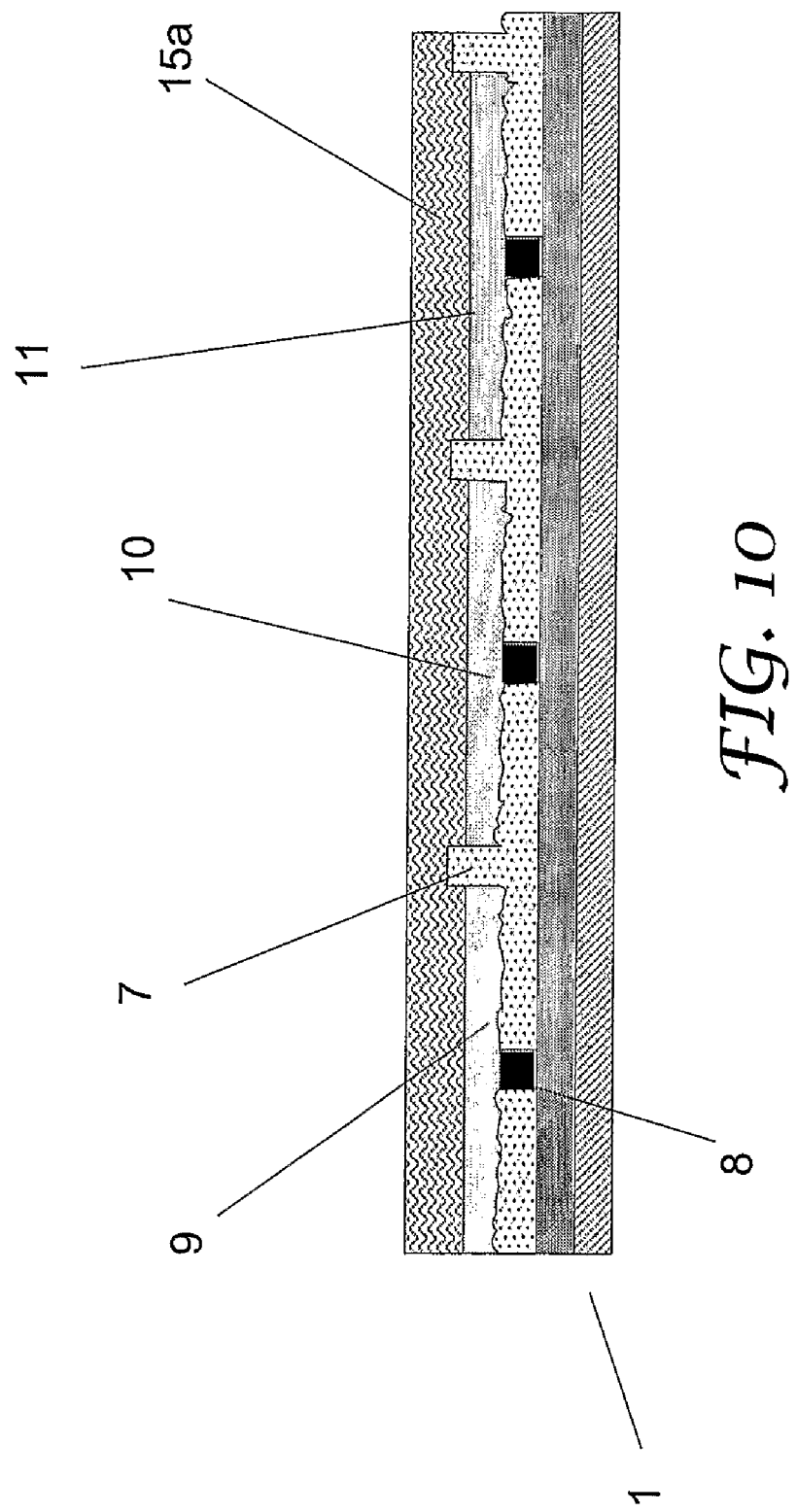
FIGS. 10 to 13 illustrate stages in an alternative method of manufacture of a display substrate for use in making a display in accordance with an embodiment of the present invention.
Figure 11:
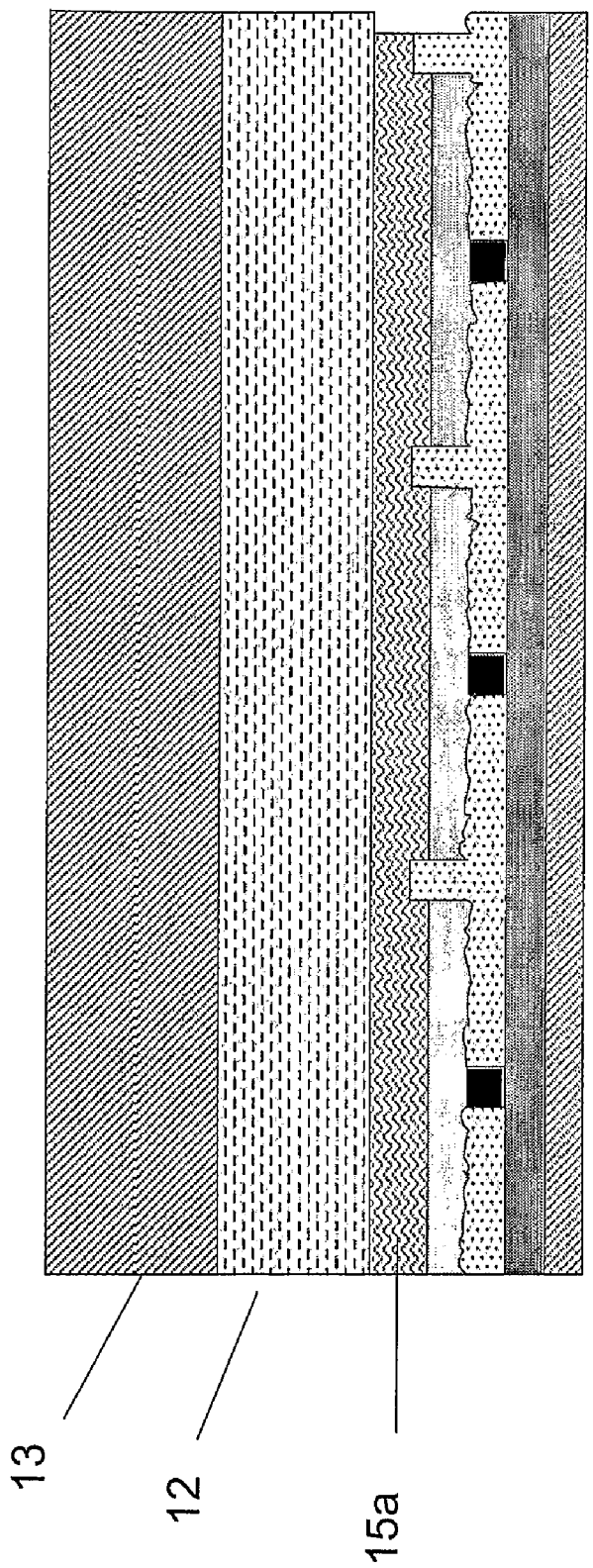
Figure 12:
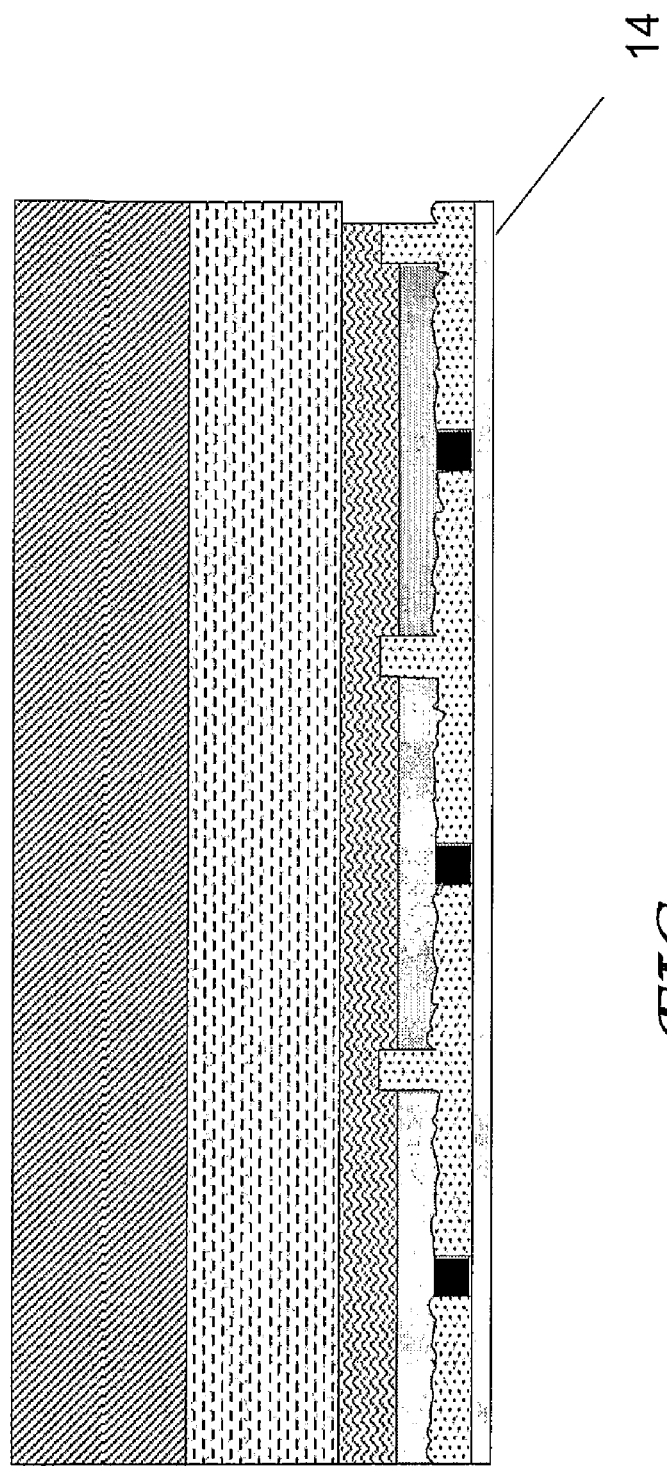
Figure 13:
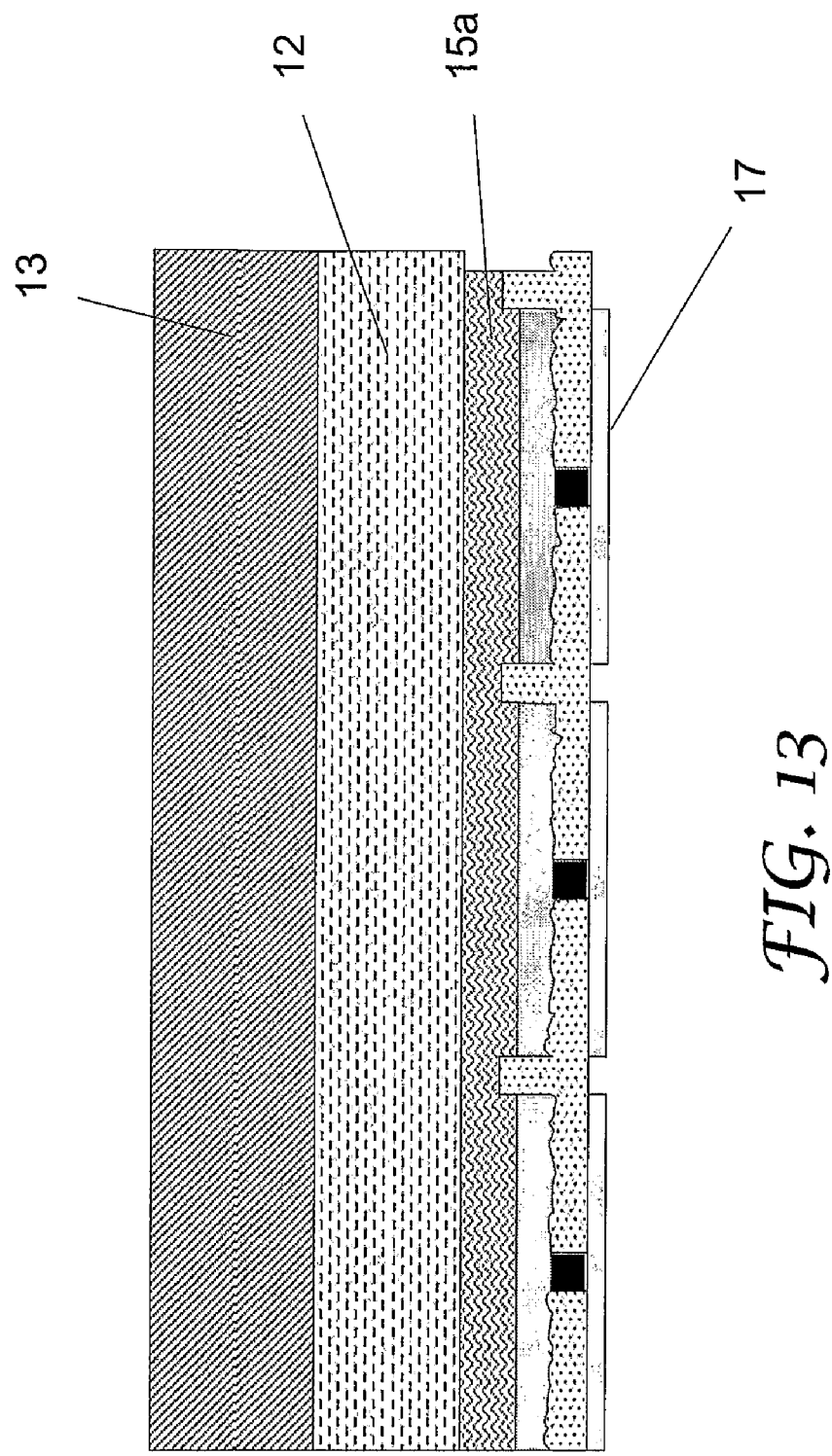
Figure 14:
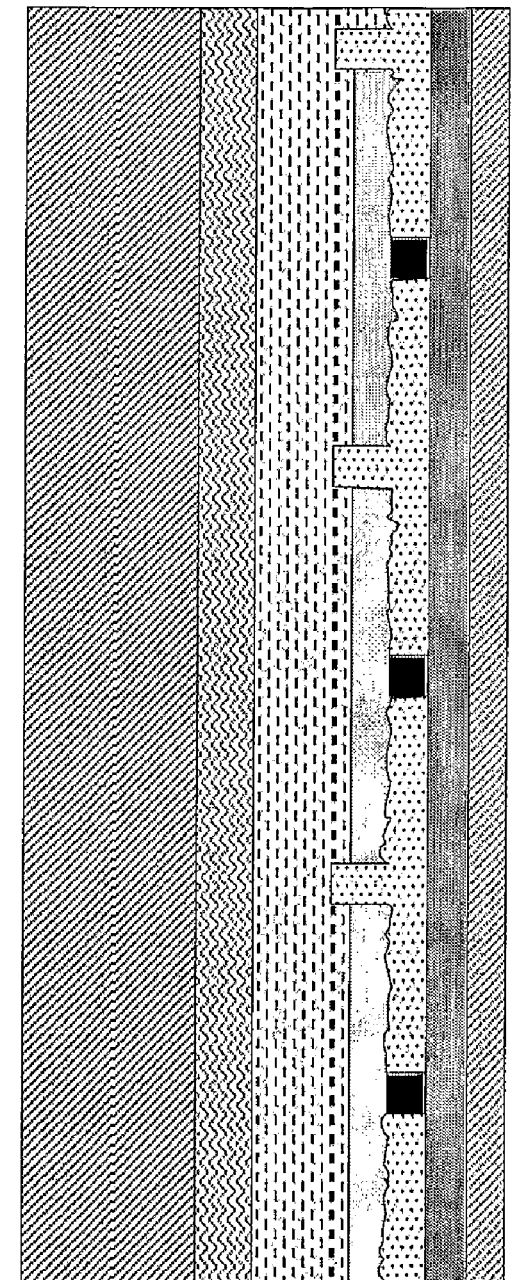
FIGS. 14 to 17 illustrate stages in another alternative method of manufacturing a display substrate for use in a display in accordance with an embodiment of the present invention.
Figure 15:
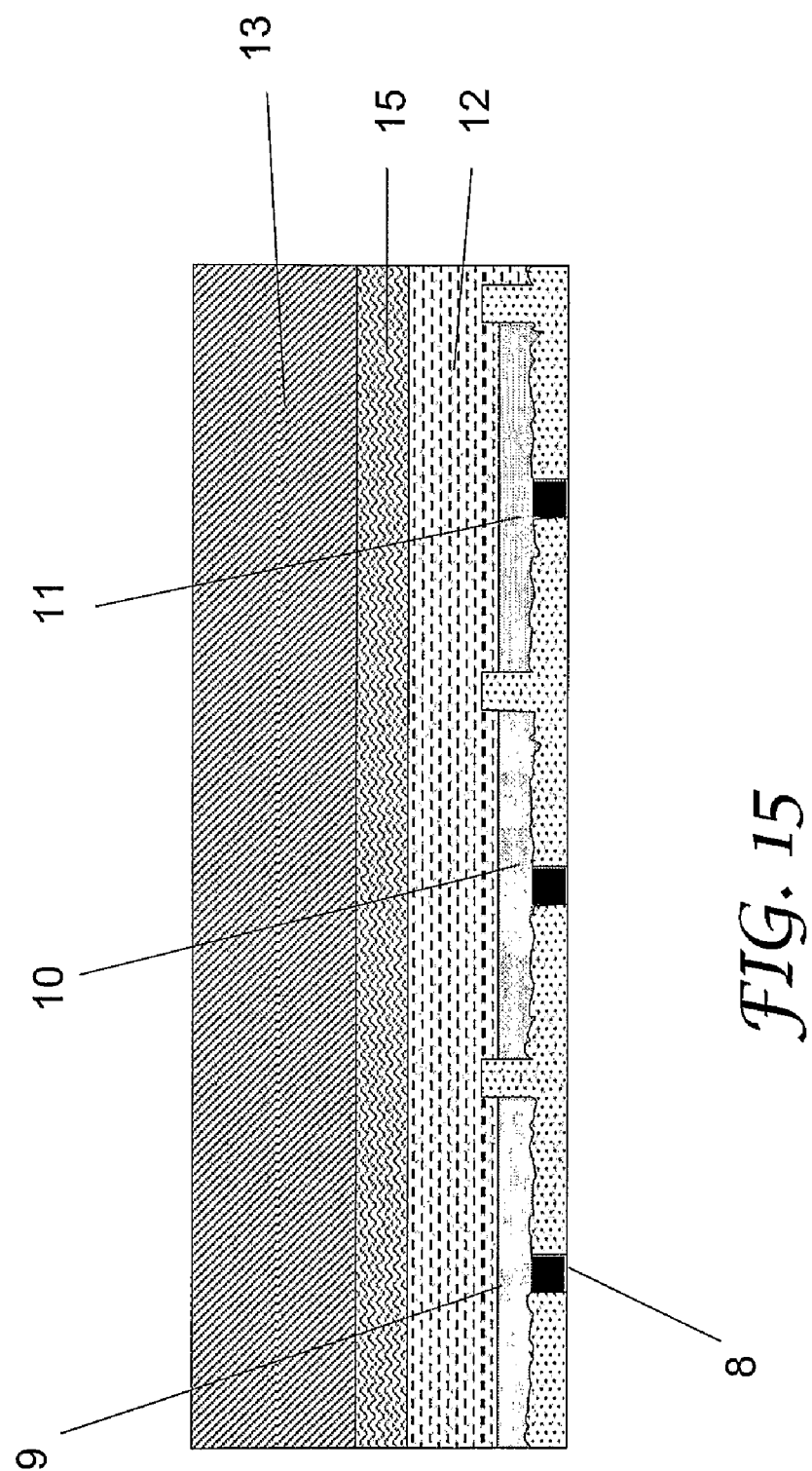

The transparent conductor 14 is then selectively etched or patterned to provide transparent electrodes 17. In the present embodiment, illustrated in FIG. 9, the conductor 14 is photopatterned by illuminating the laminate from the reverse (substrate 13) side. The colour filters 9, 10, 11 are at least partially opaque to UV, whilst the substrate 13, transfer adhesive 12 and dielectric 4 are not. Consequently, substantially the only UV transparent areas are the raised levees 7. In the preferred embodiment, PEDOT:PSS is bleached directly by the incident UV light to form the electrode structures 17. Alternatively, standard photoresists and etching may be employed, as will be described later. The resulting display substrate has colour filters, busbars and transparent electrodes in a predetermined alignment. It may be incorporated in a display, for example a liquid crystal display, using fabrication techniques well known per se to those skilled in the art of display manufacture.

Referring now to FIGS. 10 to 13, a modification of the process in illustrated in which a coatable polariser layer 15a is applied on top of the colour filter laminate structure shown in FIG. 5. After curing of the coatable polariser layer 15a, the resulting structure is adhered to a display substrate 13 using a transfer adhesive 12, followed by removal of the carrier 1, application of a transparent conductor 14, and formation of transparent electrodes 17 in a manner as previously described. A suitable coatable polariser material is sold by Optiva, Inc. Coatable polarisers are described in Bobrov, Y., Cobb, C., Lazarev, P., Bos, P., Bryand, D., Wonderly, H. "Lyotropic Thin Film Polarisers", *Society for Information Display, Int. Symp. Digest of Technical Papers*, Long Beach, Calif. May 16-18, 2000, Vol. XXXI, 1102-1107.

The process illustrated with respect to FIGS. 14 to 17 is similar to that illustrated with respect to FIGS. 6 to 9, with the difference that the colour filter/busbar structure shown in FIG. 5 is adhered to a conventional polariser 15 which is in turn adhered to the display substrate 13. Methods for adhering conventional polarisers to display substrates will be well known to those skilled in the art of LCD manufacture. Other optical films, such as compensation retarders, may also optionally be laminated inside the display without affecting the planarity and performance of the electro-optic layer interface. A benefit of having a polariser on the inside is that a substrate with uncontrolled birefringence may be used.

Figure 16:
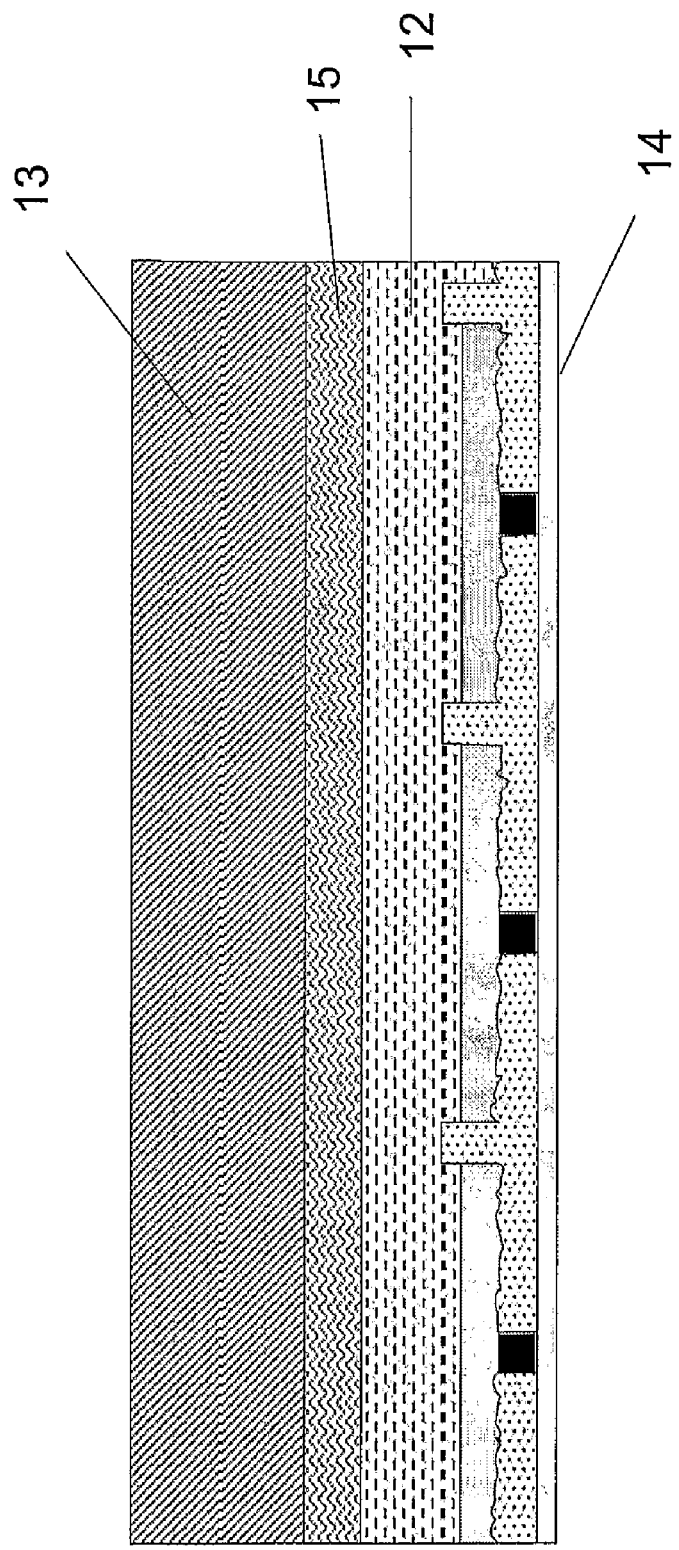
Figure 17:
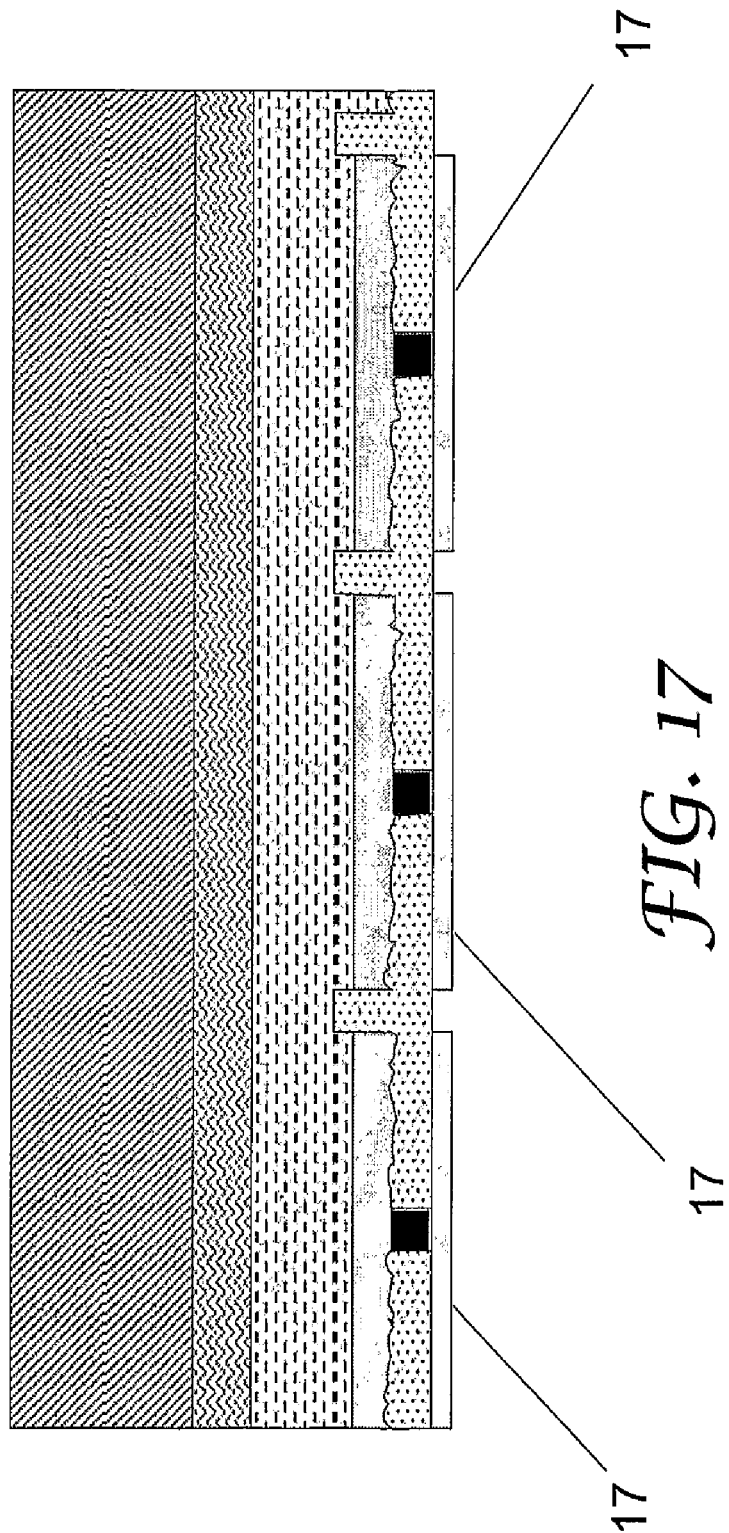
Figure 18:
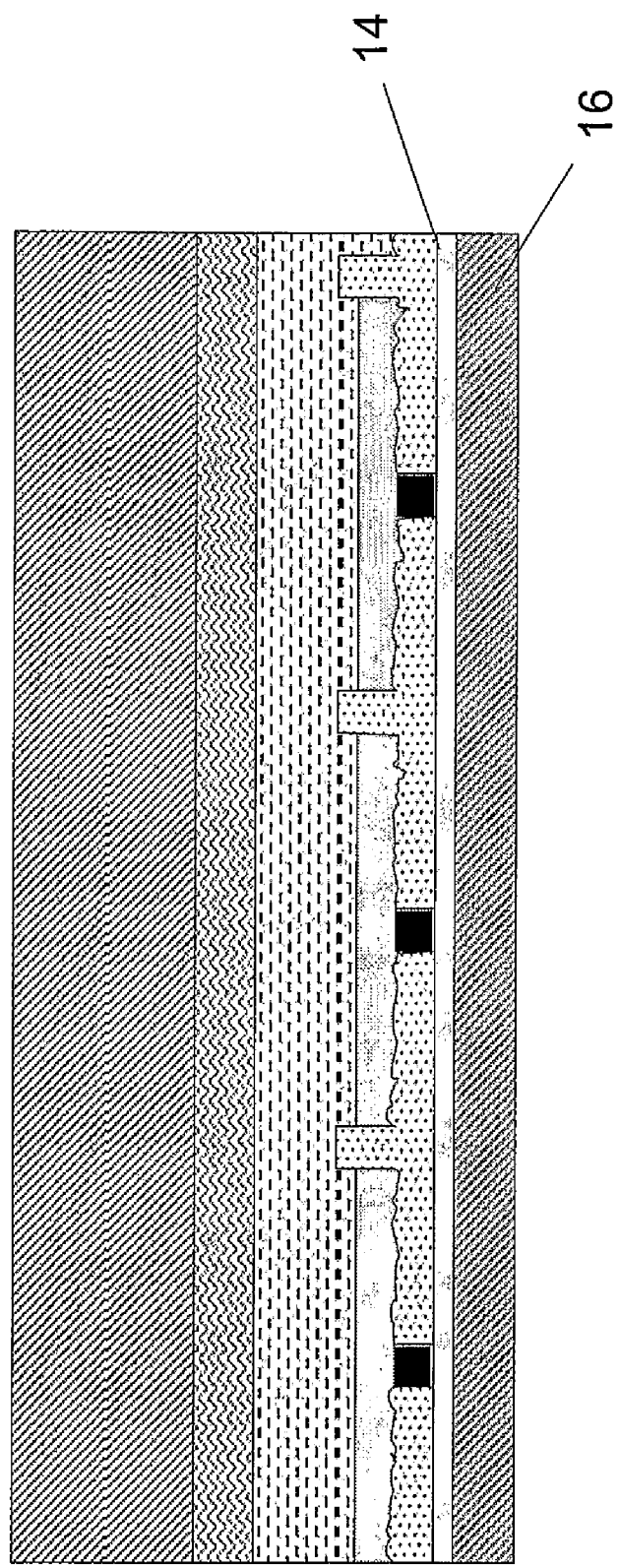
FIGS. 18 to 21 illustrate stages in a further alternative method of manufacturing a display substrate for use in a display in accordance with an embodiment of the invention.
Figure 19:
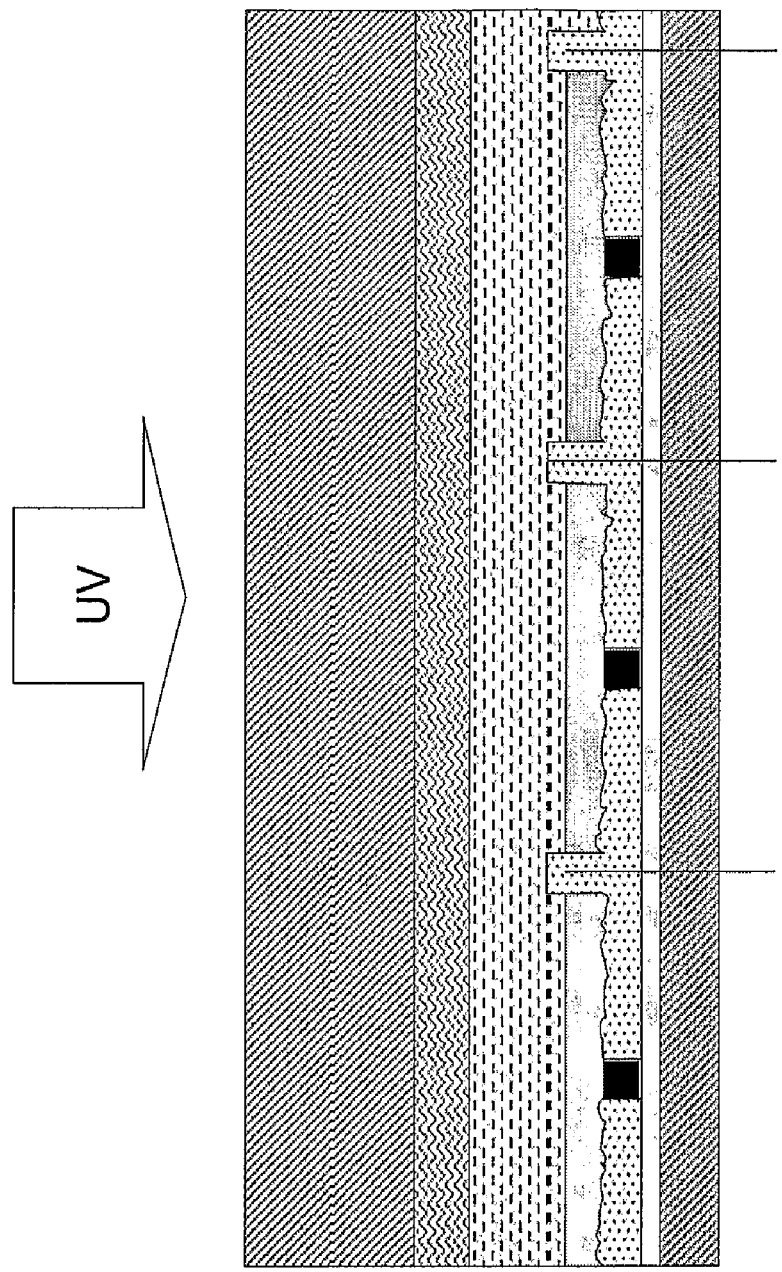
Figure 20:
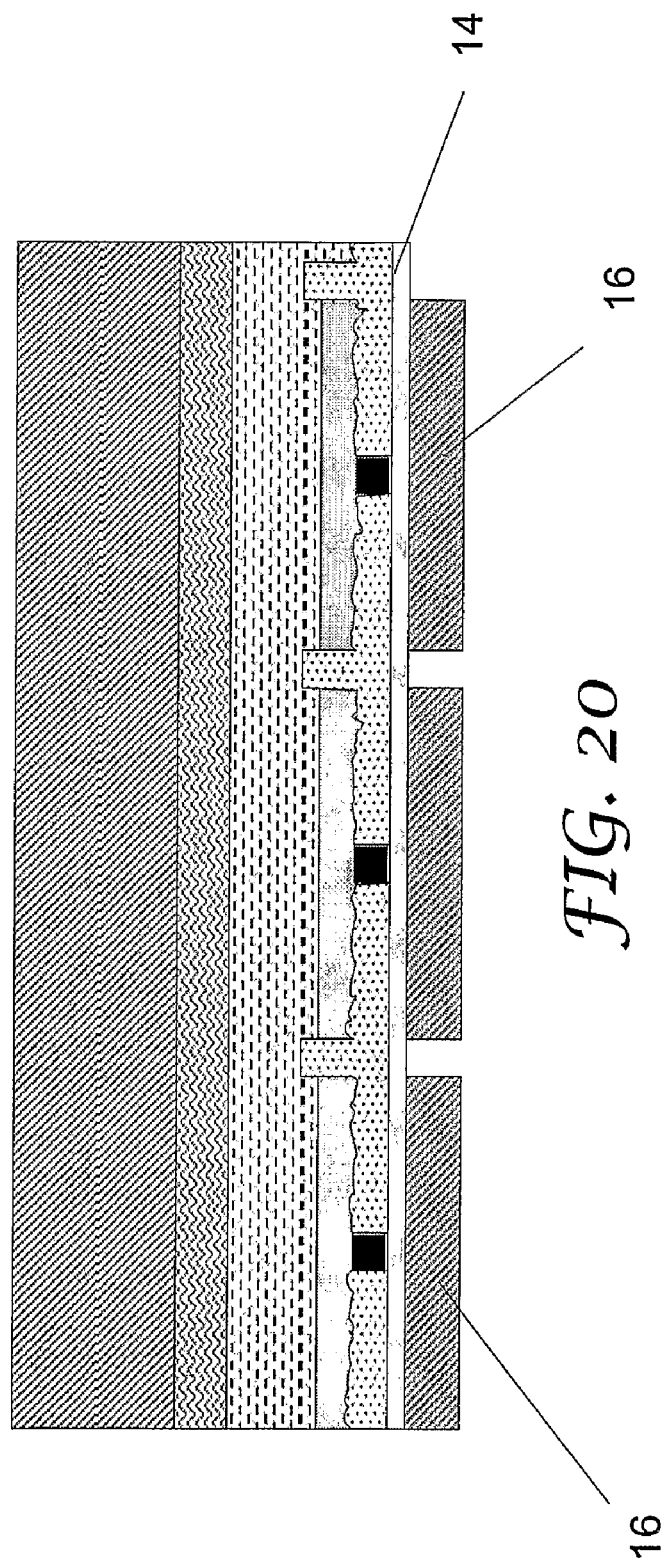
Figure 21:
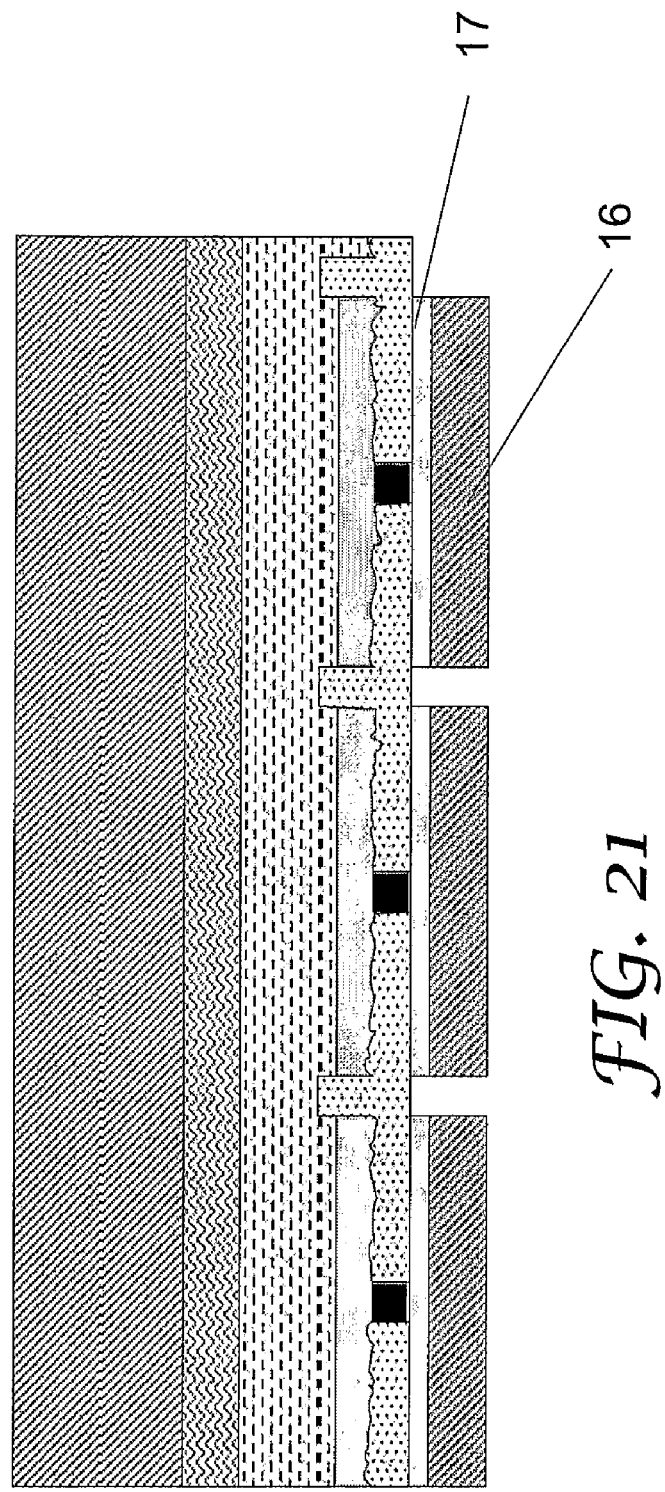

An alternative method of forming electrode tracks 17 from the transparent conductor layer 14 shown in FIG. 16 is illustrated in FIGS. 18 to 22. A positive photoresist material 16 (Shipley 1805) is coated on the transparent conductor 14 (FIG. 18). UV illumination through the substrate 13 transmits UV light through the levees 7 (FIG. 19) thereby curing the resist 16 in regions corresponding to the levees 7. The resist 16 is developed (Shipley Microposit Developer) to remove the exposed material (FIG. 20), and the transparent conductor 14 is then wet or dry etched (for example by sodium hypochlorite solution) to produce electrode tracks 17 (FIG. 21). Finally, the resist 16 is removed to leave the final substrate with electrode tracks as shown in FIG. 17. The resist 16 may be removed by means of standard solvents or a commercial resist stripper, for example acetone.

Because the colour filters are used as a mask to form the electrodes, the arrangement is self-aligning. The electrodes are aligned with the colour filter stripes and of substantially the same size and shape.

Figure 22:
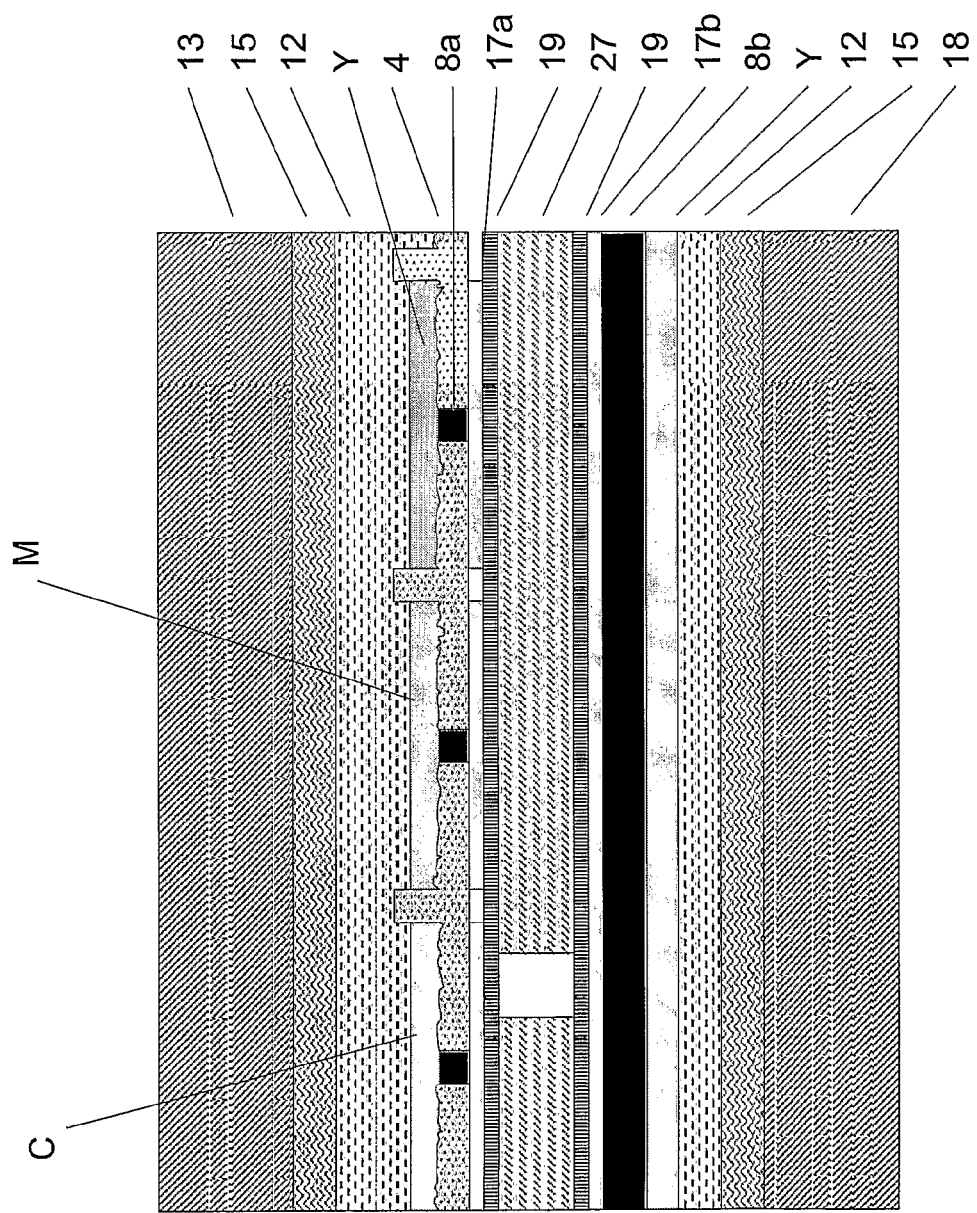
FIGS. 22 and 23 are schematic sectional and plan views respectively of a display device in accordance with an embodiment of the invention.
Figure 23:
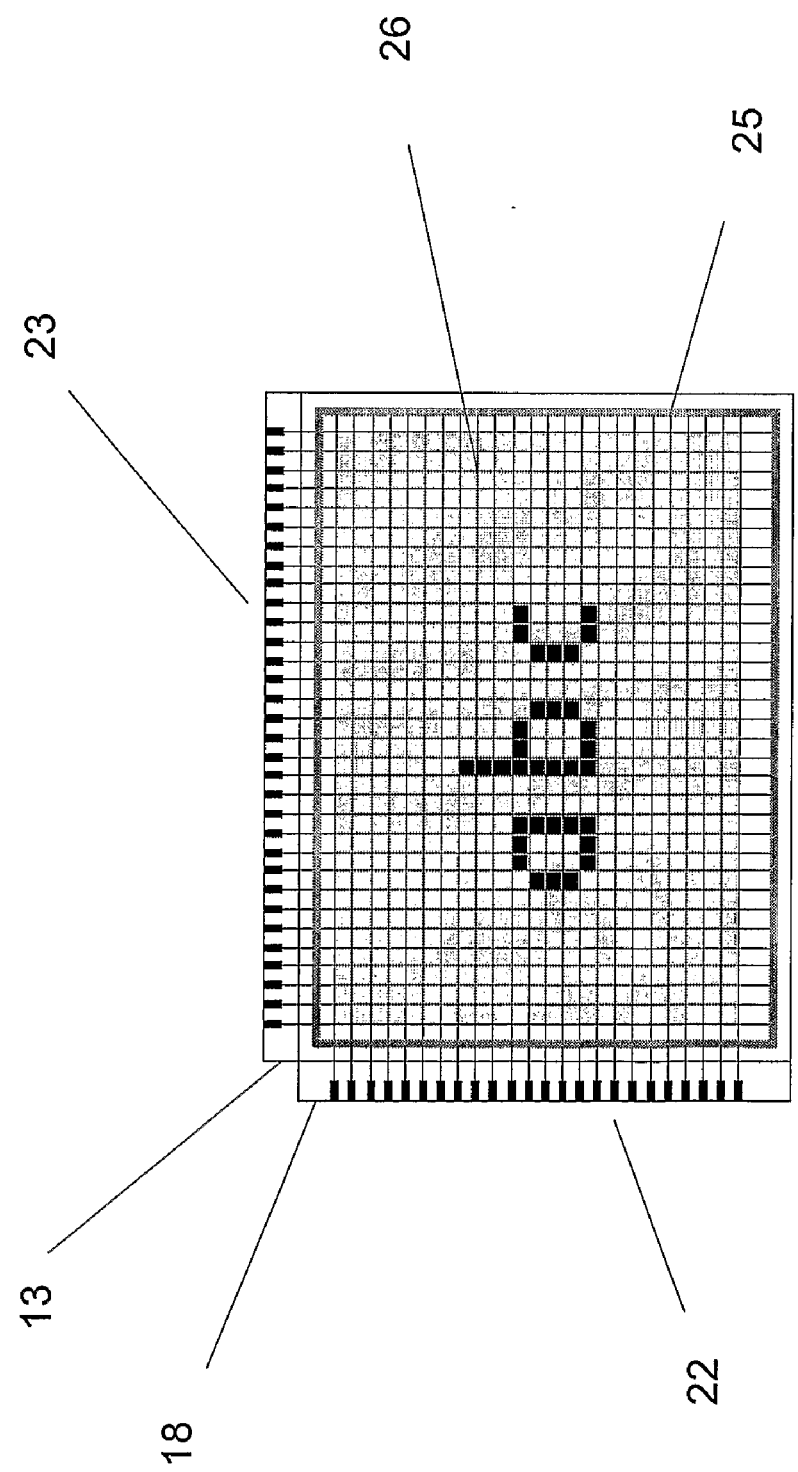

Turning now to FIGS. 22 and 23, an example of an electro-optic display device using a substrate manufactured in accordance with an aspect of the present invention is described. The device is a liquid crystal display (LCD) in this example, but the substrates may be employed in other types of display device. The device comprises a first display substrate 13 and a second display substrate 18, each of which is provided with an adhered polariser 15.

Figure 26:
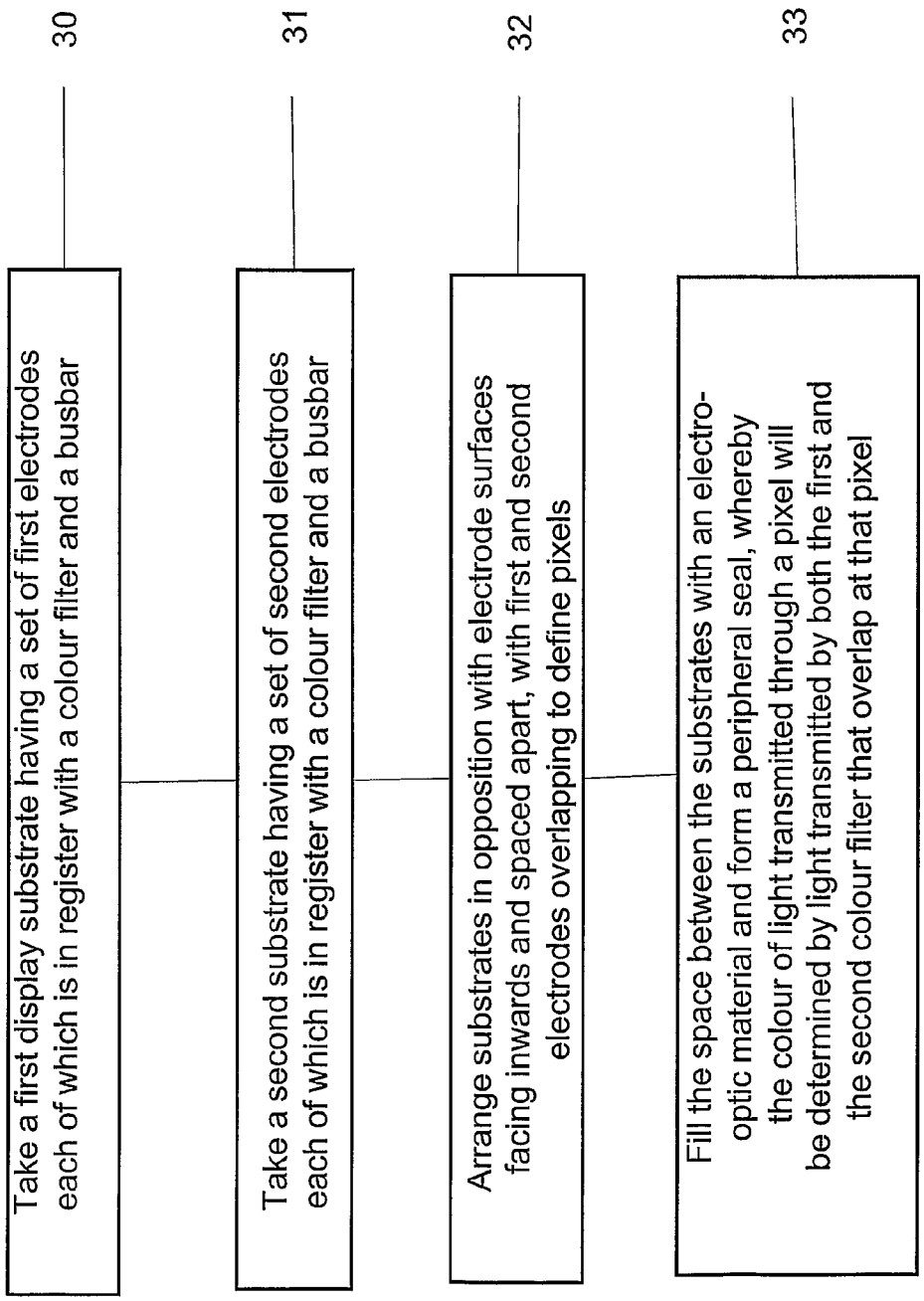
FIG. 26 is a flowchart illustrating a method of manufacturing a colour display device in accordance with an embodiment of the present invention.

Referring now to FIG. 26, a method of manufacturing a colour display device in accordance with an aspect of the present invention is described. The first general step, designated as block 30, is to take a first substrate 13 which has a set of first electrodes 17a, each of which is in register with a colour filter C, M, Y and a busbar 8a. The second general step, designated as block 31, is to take a second substrate 18 which has a set of second electrodes 17b each of which is in register with a colour filter Y and a busbar 8b. In the next step, designated as block 32. The substrates 13, 18 are arranged in opposition with electrode surfaces facing inwards and spaced apart, with the first electrodes 17a and the second electrodes 17b overlapping to define pixels therebetween. In the next step, designated as block 33, the space between the substrates 13, 18 is filled, in this example, with a nematic LC material 27 and retained between the substrates by a peripheral seal 25 (FIG. 23). Methods of sealing liquid crystal display devices are well known to those skilled in the art of LCD manufacture. As previously described, the colour of light transmitted through a pixel will be determined by light transmitted by both the first and the second colour filter that overlap at that pixel.

The structure shown in FIG. 17 is provided with an alignment layer 19 for inducing a desired local uniform alignment in molecules of a liquid crystal material 27. The polariser 15 on the second display substrate 18 is affixed to busbars 8b and second colour filters (Y is illustrated here) by a layer of adhesive 15. Lower electrode stripes 17b are formed on the busbars 8b by a similar method for that used for the first display substrate 13. The second electrode structures 17b are also provided with an alignment layer 19. Any desired alignment layers 19 known to those skilled in the art may be used, for example rubbed polyimide. Depending on the type of display mode, the two alignment layers may induce the same type of alignment (for example planar, tilted planar, or homeotropic) or different types. Where both alignment layers 19 produce a planar or tilted planar alignment, the direction of alignment may be the same or different. For example, in a twisted nematic display, both alignment layers may induce planar alignment, with the orientation of the alignments being perpendicular.

In the example illustrated in FIG. 23, a plurality of busbars 22 form row-addressing electrodes and a plurality of busbars 23 form column-addressing electrodes. Pixels 26 are defined at locations where row and column electrodes overlap, and characters or other indicia may be displayed in regions where a sufficient voltage is applied across appropriate pixels, thereby modifying the optical behaviour of the liquid crystal in the region of the pixels so that there is a visible difference when the display is viewed between the polarisers 15. The colour which is displayed by any one pixel will be a function of the light absorbed by the first and second colour filters, as previously discussed; for example yellow and magenta filters will combine to absorb blue and green, thereby producing red light.

Other features known per se may optionally be included in the display by conventional means. Examples include backlights and one or more antiglare layers.

Figure 24:
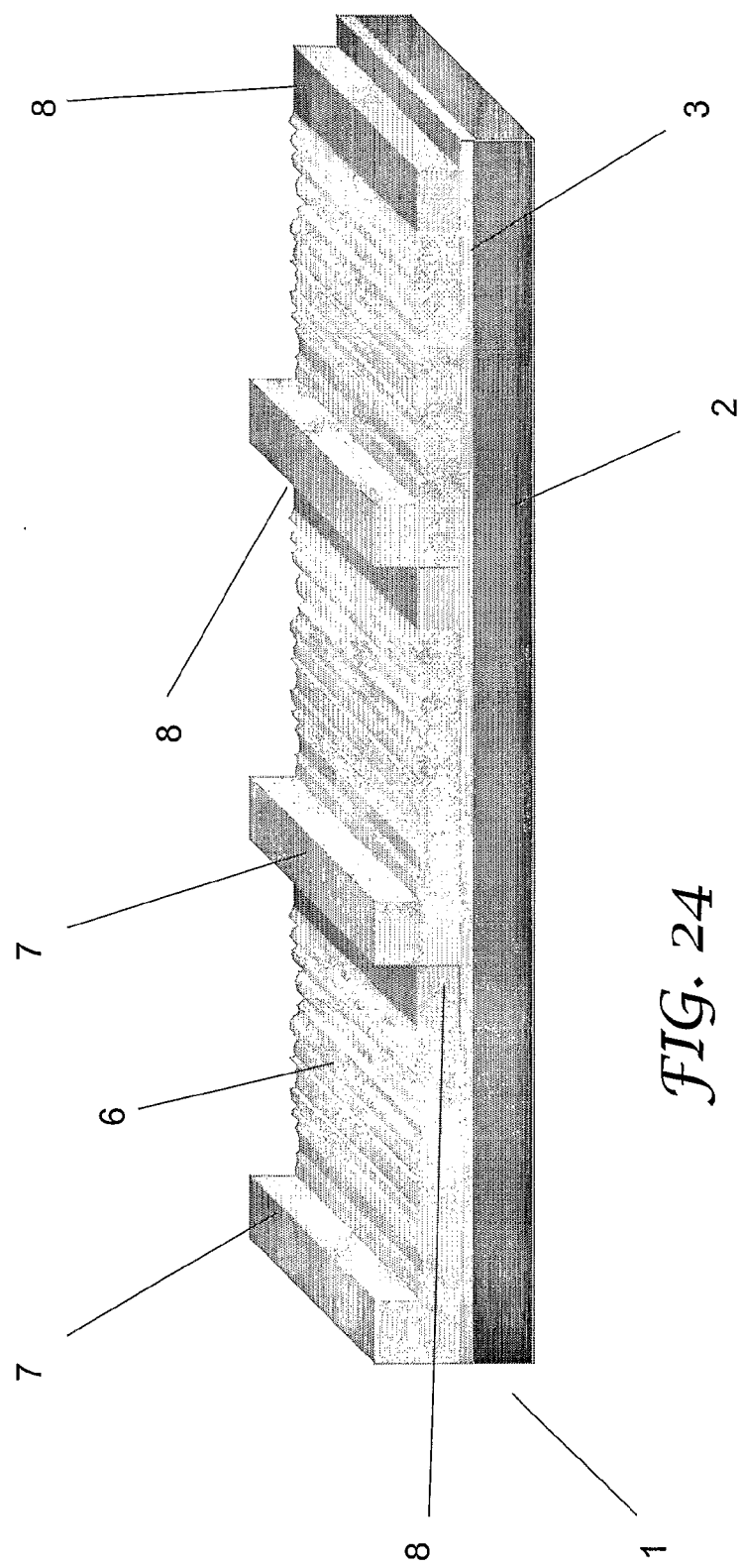
FIG. 24 is a perspective view corresponding to FIG. 3, illustrating another alternative embodiment of a method of making a display substrate for use in an example of the present invention.

Each busbar 8 need not be in the middle of its associated electrode track 17, but may be located at any desired contact line on the track. In FIG. 24, part of a transfer carrier is shown, in which the busbars 8 are formed adjacent to the levees 7 on the planar conductive surface 3. Subsequent UV exposure of a transparent conductor through the levees 7 will result in the busbars being aligned at the sides of corresponding transparent electrode tracks.

The articles "a" and "an" when used herein denote "at least one" where the context permits.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the spirit and scope of the present invention.

The invention claimed is:

1. A colour display device comprising:
a first display substrate and a second display substrate, said substrates being spaced apart and opposed to each other;
a layer of an electro-optic material between the substrates;
a set of first elongated electrodes on an inner surface of the first display substrate and a set of second elongated electrodes on an inner surface of the second display substrate, the first electrodes overlapping the second electrodes to define pixels for selectively applying an electric field across at least some of said electro-optic material, a length of the first electrodes being arranged substantially orthogonally relative to a length of the second electrodes;
a set of first elongate colour filters on the first display substrate, each of said electrodes being in register with one of said first colour filters; and
a set of second elongate colour filters on the second display substrate, each of said second electrodes being in register with one of said second colour filters, said set of first colour filters being arranged such that a length of said set of first colour filters is substantially orthogonal relative to a length of said set of second colour filters and each first colour filter overlaps at least two second color filters;
in which the colour of light transmitted through a pixel is determined by the light transmitted by both the first colour filter and the second colour filter that intersect at that pixel.

2. The device according to claim 1, wherein said first and second colour filters comprise at least two different colours selected from cyan, magenta and yellow, and selected so that any two-by-two array pixels contains at least one red, one green and one blue pixel.

3. The device according to claim 1, wherein said first colour filters comprise alternating stripes of yellow and cyan and wherein said second colour filters comprise alternating stripes of yellow magenta.

4. The device according to claim 1, wherein said first and second colour filters each comprise repeating stripes if cyan, magenta and yellow.

5. The device according to claim 1, wherein said first and second colour filters each comprise stripes of a plurality of colours, and wherein the wavelengths of light transmitted by all of said first colour filters or by all of said second colour filters would if mixed produce substantially white light.

6. The device according to claim 1, further including a backlight for illuminating the display, located adjacent to an outer surface of said second display substrate; wherein said second colour filters comprise reflectance filters so that at least some of the light which is not transmitted by said second colour filters will be reflected towards said backlight.

7. The device according to claim 6, wherein said first colour filters comprise absorbing filters, in which incident light which is not transmitted by said first colour filters will be substantially absorbed by said filters.

8. The device according to claim 1, wherein each electrode is provided with an associated busbar with which it is in registration and in electrical contact.

9. The device according to claim 1, wherein the electro-optic material is a liquid crystal material.

10. A colour display device comprising:
first and second spaced apart display substrates enclosing a layer of an electro-optic material, an inner surface of each substrate being provided with a plurality of elongate parallel electrodes and a plurality of elongate parallel colour filters, each filter being in register with an electrode;
wherein the electrodes and colour filters on one of the inner surfaces are aligned substantially orthogonally to electrodes and colour filters on the other inner surface, respectively, such that at least two adjacent first color filters of different colors intersect and overlap at least two adjacent second color filters of different colors within a single pixel, so that the colour of light transmitted through a location where two colour filters overlap is determined by the light transmitted by both of the filters.

11. A colour liquid crystal display device comprising:
first and second spaced apart display substrates enclosing a layer of a liquid crystal material, an inner surface of each substrate being provided with a plurality of elongate parallel electrodes each of which is in register with an elongate colour filter of substantially the same size and shape as the electrode with which it is registered and is provided on the same substrate;
the electrodes and colour filters on one of the inner surfaces being aligned substantially orthogonally to the electrodes and colour filters on the other inner surfaces respectively, so that the colour of light transmitted through a location where two colour filters overlap is determined by the tight transmitted by both of the filters; the device including a backlight located adjacent to an outer surface of the second display substrate, and the colour filters on the second display substrate being reflective colour filters.

12. The colour liquid crystal display device according to claim 11, wherein the colour filters on the first display substrate are absorptive colour filters.

13. The device according to claim 2, wherein said first colour filters comprise alternating stripes of yellow and cyan and wherein said second colour filters comprise alternating stripes of yellow and magenta.

14. The device according to claim 2, wherein said first and second colour filters each comprise repeating stripes of cyan, magenta and yellow.

* * * * *